(12) United States Patent
Ogasawara et al.

(10) Patent No.: US 8,609,243 B2
(45) Date of Patent: Dec. 17, 2013

(54) PRESSURE-SENSITIVE ADHESIVE OPTICAL FILM AND IMAGE DISPLAY

(75) Inventors: Akiko Ogasawara, Ibaraki (JP); Masayuki Satake, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 374 days.

(21) Appl. No.: 11/993,935

(22) PCT Filed: Jan. 23, 2007

(86) PCT No.: PCT/JP2007/050989
§ 371 (c)(1),
(2), (4) Date: Dec. 26, 2007

(87) PCT Pub. No.: WO2007/105378
PCT Pub. Date: Sep. 20, 2007

(65) Prior Publication Data
US 2009/0123718 A1    May 14, 2009

(30) Foreign Application Priority Data

Mar. 13, 2006   (JP) ................................. 2006-067569

(51) Int. Cl.
*B32B 7/12*   (2006.01)
*B32B 15/04*   (2006.01)
*C09J 7/02*   (2006.01)

(52) U.S. Cl.
CPC .................................... *C09J 7/0257* (2013.01)
USPC .. 428/355 R; 428/343; 428/353; 428/355 AC (58) Field of Classification Search
USPC ............... 428/343, 353, 354, 355 R, 355 EN, 428/355 AC
See application file for complete search history.

(56) References Cited

U.S. PATENT DOCUMENTS

2005/0158136 A1*   7/2005   Higashio et al. .............. 409/293

FOREIGN PATENT DOCUMENTS

| JP | 59-111114 A | 6/1984 |
| JP | 4-254803 A | 9/1992 |
| JP | 10-20118 A | 1/1998 |
| JP | 2002-309212 A | 10/2002 |

(Continued)

OTHER PUBLICATIONS

English Machine Translation of JP2003-049148, obtained Sep. 30, 2009.*

(Continued)

*Primary Examiner* — Callie Shosho
*Assistant Examiner* — Nicholas Kokkinos
(74) *Attorney, Agent, or Firm* — Westerman, Hattori, Daniels & Adrian, LLP (57) ABSTRACT

A pressure-sensitive adhesive optical film includes: an optical film; and a pressure-sensitive adhesive layer laminated on at least one side of the optical film with an anchor layer interposed therebetween, wherein the anchor layer has a thickness of 5 to 300 nm, the pressure-sensitive adhesive layer has a thickness of 5 to 50 μm, at least one of the anchor layer and the pressure-sensitive adhesive layer is made from a ammonia-containing water-dispersible material, the layer made from the ammonia-containing water-dispersible material contains ammonia in an amount of 10 ng or more per 1 $cm^2$ of the pressure-sensitive adhesive optical film, wherein the amount is a measurement derived from the layer, and the pressure-sensitive adhesive optical film contains ammonia in a total amount of 2000 ng or less per 1 $cm^2$ of the pressure-sensitive adhesive optical film. The pressure-sensitive adhesive optical film has good appearance and high durability.

5 Claims, 1 Drawing Sheet

(56) References Cited

FOREIGN PATENT DOCUMENTS

| JP | 2003-049148 A | 2/2003 |
|----|---------------|--------|
| JP | 2003-49148 A | 2/2003 |
| JP | 2005-206689 A | 8/2005 |

OTHER PUBLICATIONS

English Machine Translation of JP2002-309212, obtained Sep. 30, 2009.*

Notification of Transmittal of Translation of the International Preliminary Report on Patentability (Form PCT/IB/326) of International Application No. PCT/JP2007/050989 mailed Sep. 25, 2008 with Forms PCT/IB/373, PCT/IB/338 and PCT/ISA/237.
European Search Report dated Aug. 23, 2010, issued in corresponding European Patent Application No. 07713681.0.
European Office Action dated Aug. 2, 2012, issued in corresponding European Patent Application No. 07 713 681.0, (5 pages).
European Office Action dated May 5, 2011, issued in corresponding European Patent Application No. 07713681.0.
International Search Report of PCT/JP2007/050989, date of mailing May 1, 2007.

* cited by examiner

PRESSURE-SENSITIVE ADHESIVE OPTICAL FILM AND IMAGE DISPLAY

TECHNICAL FIELD

The present invention relates to a pressure-sensitive adhesive optical film in which a pressure-sensitive adhesive layer is laminated on at least one side of an optical film with an anchor layer interposed therebetween. The present invention also relates to an image displays such as liquid crystal displays, organic electroluminescence displays and plasma display panels, using the pressure-sensitive adhesive optical film. The optical film may be a polarizing plate, a retardation plate, an optical compensation film, a brightness enhancement film, or any laminate thereof.

BACKGROUND ART

A liquid crystal display indispensably requires polarizing elements disposed on both sides of a liquid crystal cell because of an image forming method adopted therein and generally polarizing plates, which comprises a transparent protective film on one side or both sides of a polarizer, are adhered. Besides, on a liquid crystal panel, various kinds of optical elements have been used in addition to a polarizing plate in order to improve a display quality of a display. For example, there have been used a retardation plate for coloration prevention, a viewing angle increasing film for improving a viewing angle of a liquid crystal display and a brightness enhancement film for raising a contrast of a display. The films each are collectively referred to an optical film.

A pressure-sensitive adhesive is usually employed in adhering an optical film described above to a liquid crystal cell. An optical film and a liquid crystal cell or optical films are usually adhered to each other using a pressure-sensitive adhesive therebetween in order to reduce a light loss. In such cases, a pressure-sensitive adhesive optical film in which a pressure-sensitive adhesive is provided in advance on one surface of an optical film as a pressure-sensitive adhesive layer is generally used because of a merit such as that no necessity arises for a drying step of fix the optical film. A pressure-sensitive adhesive optical film is also used in which a pressure-sensitive adhesive layer is provided on an optical film with an anchor layer interposed therebetween for improving the anchoring properties of the pressure-sensitive adhesive layer to the optical film (see Patent Literature 1 below).

As image display applications such as televisions, monitors, car navigation systems, and cellular phones have expanded, the pressure-sensitive adhesive optical film has been required to have high durability under various environmental conditions, such as no change in optical properties even in cases where it is allowed to stand for a long time in a high-temperature, high-humidity environment (no decomposition or degradation of transparent protective films or no change in polarization properties in the case of polarizing plates) and no occurrence of appearance defects such as foaming or peeling of the pressure-sensitive adhesive layer. In particular, due to an increase in the size, brightness or definition of liquid crystal displays, a demand for appearance improvement becomes stronger than that for conventional pressure-sensitive adhesive optical films.

A method of reducing the acrylic acid content of a pressure-sensitive adhesive (see Patent Literature 2 below) and a method of adding a tertiary amine to a pressure-sensitive adhesive (see Patent Literature 3 below) are known for the purpose of preventing decomposition or degradation of the protective film. In these methods, however, alterations in the polarization properties of polarizing plates or foaming or peeling of pressure-sensitive adhesive layers cannot be prevented.

The pressure-sensitive adhesive layer or the anchor layer is conventionally formed using a solvent-dispersible material but is often formed using a water-dispersible material recently, because of environmental problems.

Patent Literature 1: Japanese Patent Application Laid-Open (JP-A) No. 10-20118
Patent Literature 2: JP-A No. 59-111114
Patent Literature 3: JP-A No. 04-254803

DISCLOSURE OF INVENTION

Problems to be Solved by the Present Invention

It is an object of the present invention to provide a pressure-sensitive adhesive optical film that includes an optical film and a pressure-sensitive adhesive layer laminated on at least one side of the optical film with an anchor layer interposed therebetween, wherein at least one of the anchor layer and the pressure-sensitive adhesive layer is made from a water-dispersible material and that has good appearance and high durability with which alterations in optical properties can be kept small even in high-temperature, high-humidity environments. It is another object of the present invention to provide an image display using such a pressure-sensitive adhesive optical film.

Means for Solving the Problems

As a result of intensive investigations for solving the above problems, the inventors have found that the objects can be achieved with the pressure-sensitive adhesive optical film described below and thus have completed the present invention.

The present invention relates to a pressure-sensitive adhesive optical film, comprising:
an optical film; and
a pressure-sensitive adhesive layer laminated on at least one side of the optical film with an anchor layer interposed therebetween, wherein
the anchor layer has a thickness of 5 to 300 nm,
the pressure-sensitive adhesive layer has a thickness of 5 to 50 μm,
at least one of the anchor layer and the pressure-sensitive adhesive layer is made from an ammonia-containing water-dispersible material,
the layer made from the ammonia-containing water-dispersible material contains ammonia in an amount of 10 ng or more per 1 $cm^2$ of the pressure-sensitive adhesive optical film, wherein the amount is a measurement derived from the layer, and
the pressure-sensitive adhesive optical film contains ammonia in a total amount of 2000 ng or less per 1 $cm^2$ of the pressure-sensitive adhesive optical film.

In the pressure-sensitive adhesive optical film, the pressure-sensitive adhesive layer is preferably made from an ammonia-containing water-dispersible acrylic pressure-sensitive adhesive.

In the pressure-sensitive adhesive optical film, the anchor layer is preferably made from an anchor agent containing ammonia and a water-dispersible polymer.

In the pressure-sensitive adhesive optical film, the anchor agent further may contain an antistatic agent.

The present invention also relates to an image display, comprising at least one piece of the pressure-sensitive adhesive optical film. The pressure-sensitive adhesive optical film of the present invention is used as a piece or combined pieces depend on the various types on the image display such as liquid crystal displays or the like.

EFFECTS OF THE PRESENT INVENTION

In view of environmental issues, the present invention is directed to a pressure-sensitive adhesive optical film in which an anchor layer and/or a pressure-sensitive adhesive layer is made from a water-dispersible material. The water-dispersible material is often neutralized with ammonia in order to keep the dispersion stability of the water-dispersible. The water-dispersible material made of a liquid dispersion neutralized with ammonia has good dispersion stability and thus can form an anchor layer or a pressure-sensitive adhesive layer without causing appearance defects such as stripes and uneven portions. From this point of view, the amount of ammonia that is measured with respect to and derived from the ammonia contained in the anchor layer and/or the pressure-sensitive adhesive layer is controlled to be 10 ng or more per 1 $cm^2$ of the pressure-sensitive adhesive optical film. An ammonia amount of less than 10 ng can cause appearance defects such as stripes and uneven portions in the resulting pressure-sensitive adhesive optical film and thus is not preferred. The ammonia amount is preferably 15 ng or more, more preferably 20 ng or more. When the anchor layer and the pressure-sensitive adhesive layer are both made from a water-dispersible material, the amount of ammonia that is measured with respect to and derived from each layer is preferably controlled to be 10 ng or more.

On the other hand, if the ammonia content is increased in view of the dispersion stability of the water-dispersible material, the content of ammonia in the anchor layer and/or the pressure-sensitive adhesive layer can also be increased. If the content of ammonia in the anchor layer and/or the pressure-sensitive adhesive layer is high, the polarization properties of the polarizing plate (for example, serving as an optical film) can be altered in a high-temperature, high-humidity environment. This affects the optical properties so that sufficiently high durability cannot be achieved in a high-temperature, high-humidity environment. Such high ammonia content can also cause appearance defects due to foaming, peeling or the like of the anchor layer or the pressure-sensitive adhesive layer and thus is not preferred. From these points of view, the total amount of ammonia that is contained per 1 $cm^2$ of the pressure-sensitive adhesive optical film and measured with respect to the ammonia derived from the anchor layer and/or the pressure-sensitive adhesive layer is controlled to be 2000 ng or less. An ammonia amount of more than 2000 ng is not preferred in view of high durability and so on of the resulting pressure-sensitive adhesive optical film. The ammonia amount is preferably 1800 ng or less, more preferably 1500 ng or less. The ammonia amount may be measured as a total amount in the anchor layer and the pressure-sensitive adhesive layer.

DESCRIPTION OF REFERENCE MARKS

1: optical film
2: anchor layer
3: pressure-sensitive adhesive layer
4: antistatic layer.

BEST MODE FOR CARRYING OUT THE PRESENT INVENTION

Figure 1:
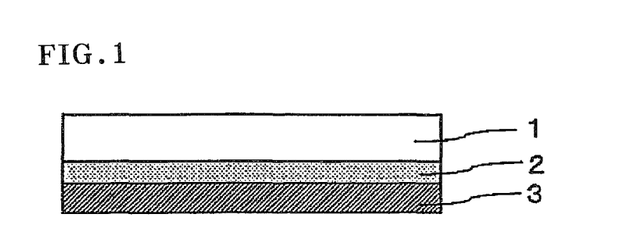
FIG. 1 is a cross-sectional view of an example of the pressure-sensitive adhesive optical film of the present invention.
Figure 2:
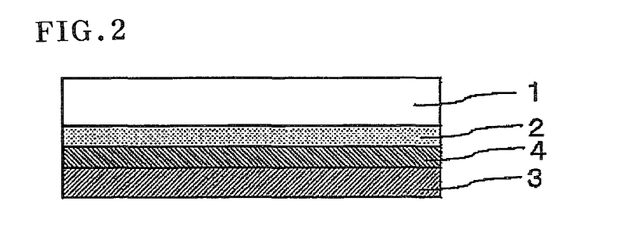
FIG. 2 is a cross-sectional view of another example of the pressure-sensitive adhesive optical film of the present invention.

As shown in FIG. 1, the pressure-sensitive adhesive optical film of the present invention includes an optical film 1 and a pressure-sensitive adhesive layer 3 laminated on one side of the optical film 1 with an anchor layer 2 interposed therebetween. As shown in FIG. 2, an antistatic layer 4 may also be provided. In FIG. 2, the antistatic layer 4 is placed between the anchor layer 2 and the pressure-sensitive adhesive layer 3. Alternatively, the antistatic layer may be provided between the optical film 1 and the anchor layer 2 or between other layers. At least one of the anchor layer 2 and the pressure-sensitive adhesive layer 3 is made from a water-dispersible material. An antistatic agent such as a water-dispersible electrically-conductive polymer may be added to the material for forming the anchor layer 2 so that an antistatic function can be imparted to the anchor layer 2.

The pressure-sensitive adhesive layer is made of a pressure-sensitive adhesive. For example, the pressure-sensitive adhesive to be used may be appropriately selected from, but not limited to, adhesives based on polymers such as acrylic polymers, silicone polymers, polyester, polyurethane, polyamide, polyether, fluoropolymers, and rubbers. In particular, pressure-sensitive adhesives having good optical transparency and exhibiting suitable wettability and adhesion properties such as cohesiveness and adhesiveness and having good weather resistance and heat resistance are preferably used. Acrylic pressure-sensitive adhesives have such characteristics and thus are preferably used.

Acrylic pressure-sensitive adhesives comprise, as a base polymer, an acrylic polymer having a main skeleton of an alkyl (meth)acrylate monomer unit. The term "(meth)acrylate" means acrylate and/or methacrylate, and "(meth)" has the same meaning with respect to the present invention. The average carbon number of the alkyl group of the alkyl (meth) acrylate forming the main skeleton of the acrylic polymer may be about 1 to 12. Examples of the alkyl (meth)acrylate include methyl (meth)acrylate, ethyl (meth)acrylate, butyl (meth)acrylate, and 2-ethylhexyl (meth)acrylate. Any of these may be used alone or in any combination. In particular, carbon atom of 1 to 9 alkyl (meth)acrylate is preferred.

In order to improve adhesion properties and heat resistance, at least one different monomer may be introduced into the acrylic polymer by copolymerization. Examples of copolymerizable monomers include hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; carboxyl group-containing monomers such as include (meth)acrylic acid, carboxyethyl (meth)acrylate, carboxypentyl (meth)acrylate, itaconic acid, maleic acid, fumaric acid, and crotonic acid; acid anhydride group-containing monomers such as maleic anhydride and itaconic anhydride; caprolactone addition products of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate.

And monomers for modification exemplified (N-substituted) amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; alkylaminoalkyl (meth)acrylate monomers such as aminoethyl (meth)acrylate, aminopropyl (meth)acrylate, N,N-dimethylaminoethyl (meth)acrylate, tert-butylaminoethyl (meth)acrylate, and 3-(3-pyrimidyl)propyl (meth)acrylate; alkoxyalkyl (meth)acrylate monomers such as methoxyethyl (meth)acrylate and ethoxyethyl (meth)acrylate; and succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine.

It is also possible to use vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; and acrylate ester monomers such as tetrahydrofurfuryl (meth)acrylate, fluoro(meth)acrylate, silicone (meth)acrylate, and 2-methoxyethyl acrylate.

Copolymerizable monomers other than the above include silicon atom-containing silane monomers. Examples of silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

In particular, carboxyl group-containing monomers such as acrylic acid are preferably used in view of adhesion durability or adhesion to liquid crystal cells for optical film applications.

The content of the copolymerized monomer in the acrylic polymer is preferably, but not particularly limited to, about 0.1 to about 10% by weight.

The weight average molecular weight of the acrylic polymer is preferably, but not limited to, from about 300,000 to about 2,500,000.

The acrylic polymer may be produced by any of various known method, depending the type of the pressure-sensitive adhesive (solvent-dispersible or water-dispersible). For example, an acrylic polymer for use in a solvent-dispersible pressure-sensitive adhesive may be prepared using a solution polymerization method. Any of various known radical polymerization initiators such as azo initiators and peroxide initiators may be used in the solution polymerization method. The reaction temperature is generally from about 50 to about 80° C., and the reaction time is generally from 1 to 8 hours. Ethyl acetate, toluene or the like is generally used as a solvent for the acrylic polymer. The concentration of the solution is generally from about 20 to about 80% by weight.

On the other hand, an acrylic polymer for use in a water-dispersible pressure-sensitive adhesive may be prepared by an emulsion polymerization method. Alternatively, a suspension polymerization method may also be used.

Any appropriate polymerization initiator, emulsifier, and the like may be selected without any particular limitation and used in the emulsion polymerization method.

Examples of the polymerization initiator include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to 0.5 parts by weight, based on 100 parts by weight of the monomer.

In the emulsion polymerization, any chain transfer agent may also be used. The use of the chain transfer agent allows appropriate control of the molecular weight of the acrylic polymer.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol.

One of these chain transfer agents may be used alone, or two or more thereof may be used in a mixture. The total content of the chain transfer agent is preferably from about 0.01 to 0.5 parts by weight, based on 100 parts by weight of the monomer.

Examples of the emulsifier include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include AQUALON HS-10, HS-20, KH-10, BC-05, BC-10, and BC-20 (each manufactured by Dai-ichi Kogyo Seiyaku Co., Ltd.) and ADEKARIA SOAP SE10N (manufactured by Asahi Denka Kogyo K.K.). The reactive emulsifier is preferred, because after polymerization, it can be incorporated into a polymer chain to improve water resistance. Based on 100 parts by weight of the monomer, the emulsifier is preferably used in an amount of 0.3 to 10 parts by weight, more preferably of 0.5 to 5 parts by weight, in view of polymerization stability or mechanical stability.

An example of the polymerization process includes first mixing the monomer and the copolymerizable monomer, adding the emulsifier and water to the mixture and then emulsifying the mixture to form an emulsion. In this process, the whole or part of the total amount of the monomer to be used may be added, and then the remainder thereof may be added dropwise during the polymerization. The polymerization initiator and optionally water are then added to the emulsion, when emulsion polymerization is performed.

Water may be added only when the emulsion is prepared. Alternatively, water may be added in the process of preparing the emulsion and then further added thereafter. The timing may be selected as appropriate depending on the polymerization method described later. The amount of the addition of water is preferably, but not limited to, such that after the emulsion polymerization, the prepared acrylic polymer can have a solids content of 30 to 75% by weight, preferably of 35 to 70% by weight.

Any method may be used for the emulsion polymerization, and any appropriate method may be selected from a batch polymerization method, a total amount dropping method, a two-stage polymerization method using a combination thereof, and the like.

An example of the batch polymerization method includes adding the monomer mixture, the emulsifier and water to a reaction vessel, emulsifying them by mixing and stirring to prepare an emulsion, and then adding the polymerization initiator and optionally water to the reaction vessel to carry out emulsion polymerization.

In the total amount dropping method, the monomer mixture, the emulsifier and water are first added and emulsified by stirring and mixing to prepare a liquid to be added dropwise, while the polymerization initiator and water are added to a reaction vessel, and then the liquid is added dropwise to the reaction vessel to carry out emulsion polymerization.

The pressure-sensitive adhesive (of any of the solvent-dispersible and the water-dispersible) may be a pressure-sensitive adhesive composition comprising the base polymer blended with a crosslinking agent. Examples of the crosslinking agent that may be blended into the pressure-sensitive adhesive include organic crosslinking agents and multifunctional metal chelates. Examples of organic crosslinking agents include epoxy crosslinking agents, isocyanate crosslinking agents, imine crosslinking agents, oxazoline crosslinking agents, melamine crosslinking agents, and aziridine crosslinking agents. The organic crosslinking agent is preferably an isocyanate crosslinking agent. In the case of the water-dispersible pressure-sensitive adhesive, the isocyanate crosslinking agent preferably uses a protecting group-containing block isocyanate compound. The multifunctional metal chelate may comprise a multivalent metal and an organic compound that are covalently or coordinately bonded to one another. Examples of the multivalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The base polymer such as the acrylic polymer and the crosslinking agent are preferably, but not limited to, blended in any ratio, 100 parts by weight of the base polymer (solid) is generally blended with about 0.01 to 10 parts by weight, more preferably about 0.1 to 5 parts by weight of the crosslinking agent (solid).

If necessary, the pressure-sensitive adhesive may conveniently contain various types of additives such as tackifiers, plasticizers, fillers such as glass fibers, glass beads, metal power, or any other inorganic powder, pigments, colorants, antioxidants, ultraviolet absorbers, and silane-coupling agents, without departing from the object of the present invention. The pressure-sensitive adhesive layer may also contain fine particles so as to have light diffusion properties.

When a water-dispersible pressure-sensitive adhesive (particularly water-dispersible acrylic pressure-sensitive adhesive) is used as the pressure-sensitive adhesive, the water-dispersible pressure-sensitive adhesive is neutralized with aqueous ammonia before it is used. The aqueous ammonia is generally used in the form of an aqueous solution with a concentration of 1 to 20%. The addition of the aqueous ammonia is controlled such that the pressure-sensitive adhesive layer formed on the optical film can contain ammonia in an amount of 10 ng or more and that the pressure-sensitive adhesive optical film can contain ammonia in an amount of 2000 ng or less. The content of ammonia in the pressure-sensitive adhesive layer may be controlled by appropriately setting the amount of ammonia in the anchor layer, the thickness of the pressure-sensitive adhesive layer, or the like.

The aqueous ammonia to be added generally contains ammonia in an amount of about 0.05 to about 5 parts by weight, preferably of 0.1 to 1 part by weight, based on 100 parts by weight of the solids of the water-dispersible pressure-sensitive adhesive.

Besides the above additives, any known material such as a pH buffer, an antifoaming agent, and a stabilizing agent may be appropriately used for the water-dispersible pressure-sensitive adhesive neutralized with aqueous ammonia.

Examples of the material for forming the anchor layer include, but are not limited to, various polymers, metal oxide sols, and silica sols. In particular, polymers are preferably used. The polymers to be used may be any of a solvent-soluble type, a water-dispersible type, and a water-soluble type.

Examples of the polymers include polyurethane resins, polyester resins, acrylic resins, polyether resins, cellulose resins, polyvinyl alcohol resins, polyvinylpyrrolidones, and polystyrene resins. In particular, polyurethane resins, polyester resins, and acrylic resins are preferred. Any appropriate crosslinking agent may be added to any of these resins. Besides the above, one or more binder components may be appropriately used depending on the purpose.

Other examples of the polymers include polymers containing an amino group in their molecule. Examples of the polymers containing an amino group in their molecule include polyethyleneimine, polyallylamine, polyvinylamine, polyvinylpyridine, polyvinylpyrrolidine, and polymers of an amino group-containing monomer such as dimethylaminoethyl acrylate, which is indicated above as a copolymerizable monomer for the acrylic pressure-sensitive adhesive. In particular, polyethyleneimine is preferred.

When the anchor layer is made from a water-dispersible material, a water-dispersible polymer may be used. The water-dispersible polymer may be an emulsion prepared by emulsifying polyurethane, polyester or any other resin with an emulsifier or may comprise a self-emulsified resin prepared by introducing a water-dispersible anionic, cationic or nonionic group into a resin.

Besides the above, a crosslinking reactive water-soluble compound may also be used as a material for forming the anchor layer. The crosslinking reactive water-soluble compound may be a monomer, oligomer or polymer that is soluble in water before the crosslinking reaction and may be a compound that can form a three-dimensional network structure and become insoluble in water after the crosslinking reaction. Examples of the crosslinking reactive water-soluble compound include two-component reactive water-soluble epoxy resins, melamine-formalin resins, and urea-formalin resins.

The two-component reactive water-soluble epoxy resin may comprise a water-soluble multifunctional epoxy resin as a main component and a water-soluble curing agent, in which when both components are mixed, an addition type crosslinking reaction occurs so that a three-dimensional polymer network structure is formed. Examples of the water-soluble multifunctional epoxy resin include aliphatic glycidyl ethers such as triglycidyl isocyanurate, sorbitol polyglycidyl ether, (poly)glycerol polyglycidyl ether, (poly)ethylene glycol diglycidyl ether, and (poly)propylene glycol diglycidyl ether; and alicyclic glycidyl ethers such as sorbitan polyglycidyl ether. Examples of the water-soluble curing agent include aliphatic polyamines such as diethylenetriamine, triethylenetetramine and polyamidoamine; imidazoles such as 2-methylimidazole and 2-ethyl-4-methylimidazole; tertiary amines such as benzyldimethylamine; acid anhydrides such as methylhymic anhydride and phthalic anhydride; and Lewis acids such as boron trifluoride.

Urea-formalin resins or melamine-formalin resins may be obtained by subjecting, to a dehydration condensation reaction, an initial prepolymer prepared by the addition reaction between urea and formaldehyde or between melamine and formaldehyde. The initial prepolymer may be modified with phenols, benzoguanamine or the like. Commercially available examples of the initial prepolymer include URAMINE series (manufactured by Mitsui Chemicals, Inc.) and NIKALAC series (manufactured by Sanwa Chemical Co., Ltd.).

When the water-dispersible polymer is used for the anchor agent, the anchor agent is neutralized with aqueous ammonia before it is used. The aqueous ammonia is generally used in the form of an aqueous solution with a concentration of 1 to 20%. The addition of the aqueous ammonia is controlled such that the anchor layer formed on the optical film can contain ammonia in an amount of 10 ng or more and that the pressure-sensitive adhesive optical film can contain ammonia in an amount of 2000 ng or less. The content of ammonia in the anchor layer may be controlled by appropriately setting the amount of ammonia in the pressure-sensitive adhesive layer, the thickness of the anchor layer, or the like.

The aqueous ammonia to be added generally contains ammonia in an amount of about 0.05 to 5 parts by weight, preferably of 0.1 to 1 part by weight, based on 100 parts by weight of the solids of the water-dispersible polymer.

The anchor agent may contain an antistatic agent. The antistatic agent may be of any type, as long as it can impart electrical conductivity. Examples thereof include ionic surfactants, electrically-conductive polymers, metal oxides, carbon blacks, and carbon nanomaterials.

Examples of ionic surfactants include cationic surfactants (such as quaternary ammonium salt type, phosphonium salt type, and sulfonium salt type surfactants), anionic surfactants (such as carboxylic acid type, sulfonate type, sulfate type, phosphate type, and phosphite type surfactants), amphoteric surfactants (such as sulfobetaine type, alkylbetaine type, and alkylimidazolinium betaine type surfactants), and nonionic surfactants (such as polyhydric alcohol derivatives, β-cyclodextrin inclusion complexes, sorbitan fatty acid monoesters, sorbitan fatty acid diesters, polyalkylene oxide derivatives, and amine oxides).

The electrically-conductive polymer to be used has good optical properties, good appearance, good antistatic effect, and good stability of antistatic effect during heating or humidifying. Examples of such an electrically-conductive polymer include such polymers as polyaniline, polythiophene, polypyrrole, and polyquinoxaline. In particular, polyaniline and polythiophene are preferably used, because they can easily form an ultraviolet-curable electrically-conductive polymer, a water-soluble electrically-conductive polymer or a water-dispersible electrically-conductive polymer.

If a water-soluble electrically-conductive polymer or a water-dispersible electrically-conductive polymer is used, a coating liquid for forming the antistatic layer can be prepared in the form of an aqueous solution or an aqueous dispersion, with no need to use an organic solvent for the coating liquid. Thus, organic solvent-induced alteration or degradation of the optical film can be prevented. The aqueous solution or dispersion preferably uses only water as the solvent, in view of adhesion. However, the aqueous solution or dispersion may contain a hydrophilic solvent. Examples of the hydrophilic solvent include alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol.

The water-soluble or -dispersible polyaniline preferably has a polystyrene-converted weight average molecular weight of 500,000 or less, more preferably of 300,000 or less. The water-soluble or -dispersible polythiophene preferably has a polystyrene-converted weight average molecular weight of 400,000 or less, more preferably of 300,000 or less. If the weight average molecular weight is more than the above value, the water solubility or dispersibility can tend to be insufficient. If such an insufficient polymer is used to form a coating liquid (an aqueous solution or dispersion), the solids of the polymer can tend to remain in the coating liquid, or the coating liquid can tend to have high viscosity so that it can be difficult to form an antistatic layer with a uniform thickness.

The water solubility of the water-soluble electrically-conductive polymer means that it has a solubility of 5 g or more in 100 g of water. The water-soluble electrically-conductive polymer preferably has a solubility of 20 to 30 g in 100 g of water. The water-dispersible electrically-conductive polymer refers to an electrically-conductive polymer such as polyaniline and polythiophene that can be dispersed in the form of fine particles in water. An aqueous dispersion thereof has low liquid viscosity so that it can be easily applied to form a thin coating film and that it can form a coating layer with good uniformity. The size of the fine particles is preferably 1 µm or less in view of uniformity of the antistatic layer.

The water-soluble or -dispersible electrically-conductive polymer such as polyaniline and polythiophene preferably has a hydrophilic functional group in its molecule. Examples of the hydrophilic functional group include sulfone, amino, amide, imino, quaternary ammonium salt, hydroxyl, mercapto, hydrazino, carboxyl, sulfate ester, and phosphate ester groups, or salts thereof. The hydrophilic functional group in the molecule facilitates the solubility in water or the dispersibility of fine particles in water and allows easy preparation of the water-soluble or -dispersible electrically-conductive polymer.

Commercially available examples of the water-soluble electrically-conductive polymer include polyaniline sulfonic acid (150,000 in polystyrene-converted weight average molecular weight, manufactured by Mitsubishi Rayon Co., Ltd.) and the like. Commercially available examples of the water-dispersible electrically-conductive polymer include polythiophene electrically-conductive polymers (DENATRON series, manufactured by Nagase ChemteX Corporation) and the like.

Examples of the metal oxide include tin oxide materials, antimony oxide materials, indium oxide materials, and zinc oxide materials. In particular, tin oxide materials are preferred. Examples of the tin oxide materials include not only tin oxide but also antimony-doped tin oxide, indium-doped tin oxide, aluminum-doped tin oxide, tungsten-doped tin oxide, and a titanium oxide-cerium oxide-tin oxide complex, and a titanium oxide-tin oxide complex. The metal oxide is generally in the form of fine particles and preferably used in the form of particles or needles. The average particle size of the fine particles may be from about 1 to 100 nm, preferably from 2 to 50 nm.

Examples of the other materials include acetylene black, ketjen black, natural graphite, artificial graphite, titanium black, carbon nanomaterials, homopolymers or copolymers of a monomer having a cationic electrically-conductive group (such as a quaternary ammonium salt), a monomer having an amphoionic electrically-conductive group (such as a betaine compound), a monomer having an anionic electrically-conductive group (such as a sulfonate salt), or a monomer having a nonionic electrically-conductive group (such as glycerin), ionic electrically-conductive polymers such as polymers having a structural unit derived from quaternary ammonium salt group-containing acrylate or methacrylate, and polymer alloys of a hydrophilic polymer such as a polyethylene methacrylate copolymer with an acrylic resin or the like. Examples of carbon nanomaterials include carbon nanotubes, carbon nanohorns, carbon nanowalls, and fullerenes. In particular, carbon nanotubes are preferably used.

For example, the antistatic agent may be blended in an amount of 70 parts by weight or less, preferably of 50 parts by weight or less, based on 100 parts by weight of the polymers used for the anchor agent. In view of antistatic effect, the blended amount is preferably 10 parts by weight or more, more preferably 20 parts by weight or more.

The antistatic agent may also be used to form an antistatic layer as shown in FIG. 2. When the antistatic layer is formed, any appropriate binder component may be used together. The binder component may be of any type, and various resins such as thermosetting resins and ultraviolet-curable resins may be used as the binder components. The polymers for use in forming the anchor layer may also be used as the binder components.

The optical film for use in the pressure-sensitive adhesive optical film of the present invention may be any type of film that has been used to form image displays such as liquid crystal displays. For example, the optical film serves as a polarizing plate. A polarizing plate comprising a polarizer and a transparent protective film provided on one side or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is 1 to 500 μm, especially 5 to 200 μm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: Rth= [(nx+ny)/(2-nz)]d, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. The polarizer and the protective film are bonded with an aqueous adhesive. The aqueous adhesive includes isocyanate based adhesives, polyvinyl alcohol based adhesives, gelatin based adhesives, vinyl based latex based, aqueous polyester based adhesives, and the likes.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Further an optical film of the present invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from about 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised.

Proper adhesion means, such as an adhesive layer, may be used for laminating. On the occasion of adhesion of the above described polarizing plate and other optical films, the optical axis may be set as a suitable configuration angle according to the target retardation characteristics etc.

Next, methods for producing the pressure-sensitive adhesive optical film of the present invention are described below.

For example, the anchor agent is applied to the optical film described above and dried to form an anchor layer. The solids content of the anchor agent coating liquid is preferably controlled to be about 0.1 to 5% by weight. The coating method may be a roll coating method such as reverse coating and gravure coating, a spin coating method, a screen coating method, a fountain coating method, a dipping method, a spray method, or the like. When a water-dispersible material is used as the anchor agent to form the anchor layer, the amount of ammonia in the anchor layer can be controlled by adjusting the drying temperature or the drying time. The drying temperature is preferably from 30 to 150° C., more preferably from 40 to 120° C., and the drying time is preferably from 0.5 to 10 minutes, more preferably from 1 to 5 minutes.

The anchor layer has a thickness of 5 to 300 nm, preferably of 10 to 200 nm. An anchor layer with a thickness of less than 5 nm is insufficient to ensure anchoring between the optical film and the pressure-sensitive adhesive layer. If the thickness is more than 300 nm, the anchor layer (for example, containing an antistatic agent) can be insufficient in strength so that destruction can easily occur in the anchor layer and that sufficient anchoring cannot be achieved in some cases.

When the anchor layer is formed, the optical film may be subjected to an activation process. Various methods such as corona treatment, low-pressure UV treatment, and plasma treatment may be used for the activation process. The activation process is effective when a water-dispersible material is used for the anchor layer (and when a water-dispersible electrically-conductive polymer is used for the antistatic agent). The activation process is effective particularly when the optical film is made of a polyolefin resin or a norbornene resin.

When the pressure-sensitive adhesive layer is formed, it may be laminated on the anchor layer. Examples of the method for forming the pressure-sensitive adhesive layer include, but are not limited to, a method including applying a solution or aqueous dispersion of a pressure-sensitive adhesive to the anchor layer and drying it and a method including transferring a pressure-sensitive adhesive layer from a release sheet. The coating method may be performed similarly to the case of the anchor agent. The pressure-sensitive adhesive layer has a thickness of 5 to 50 μm, preferably of 10 to 40 μm. When a water-dispersible material is used as a pressure-sensitive adhesive agent to form a pressure-sensitive adhesive layer, the amount of ammonia in the pressure-sensitive adhesive layer can be controlled by adjusting the drying temperature or the drying time. The drying temperature is preferably from 80 to 200° C., more preferably from 100 to 150° C., and the drying time is preferably from 0.5 to 10 minutes, more preferably from 1 to 5 minutes.

Examples of constituent materials of a release sheet include: proper thin items such as paper; synthetic resin films made of polyethylene, polypropylene, polyethylene terephthalate; a rubber sheet, paper, cloth, unwoven fabric, net, a foam sheet and a metal foil, and a laminate thereof. In order to enhance releasability from a pressure-sensitive adhesive layer, a release treatment imparting a low adherence, such as a silicone treatment, a long chain alkylation treatment or a fluorination treatment, may be applied onto a surface of a release sheet when required.

In addition, ultraviolet absorbing property may be given to the above-mentioned each layer of the optical film, and the adhesive layer etc., using a method of adding UV absorbents, such as salicylic acid ester type compounds, benzophenol type compounds, benzotriazol type compounds, cyano acrylate type compounds, and nickel complex salt type compounds.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other components such as a lighting system and incorporating a driving circuit according to any conventional technique, except that the optical film of the present invention is used. Any type of liquid crystal cell may also be used such as a TN type, an STN type and a π type.

Suitable liquid crystal displays, such as liquid crystal display with which the above pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The present invention is more specifically described with some examples below which are not intended to limit the scope of the present invention. In each example, "part," "parts" and "%" are all by weight.

Example 1

Preparation of Optical Film

An 80 µm-thick polyvinyl alcohol film was stretched 5 times in an aqueous iodine solution at 40° C. and then dried at 50° C. for 4 minutes to give a polarizer. A triacetylcellulose film was bonded to both sides of the polarizer with a polyvinyl alcohol adhesive so that a polarizing plate was obtained.

(Formation of Anchor Layer)

A water-dispersible material with a solids content of 4% (an anchor agent) was prepared from a solution A (DENATRON P-502RG, 4% in solids content, manufactured by Nagase ChemteX Corporation) containing a water-dispersible, electrically-conductive, polythiophene polymer and a water-dispersible polyester resin, and aqueous ammonia at a concentration of 10%. The weight ratio of the solution A to the aqueous ammonia (solution A:aqueous ammonia) was 100:0.1. The anchor agent was applied to one side of the polarizing plate with a wire bar such that the coating would have a post-drying thickness of 100 nm, and then the coating was dried at 100° C. for 1 minute to form an anchor layer.

(Formation of Pressure-Sensitive Adhesive Layer)

A solution (24% in solids content) was used that contained, as a base polymer, an acrylic polymer with a weight average molecular weight of 2,000,000 comprising a copolymer of butyl acrylate, acrylic acid and 2-hydroxyethyl acrylate (100: 5:0.1 in weight ratio). Based on 100 parts of the solids of the polymer, 3.2 parts of CORONATE L (an isocyanate multi-functional compound, manufactured by Nippon Polyurethane Industry Co., Ltd.), 0.6 parts of an additive (KBM-403, manufactured by Shin-Etsu Silicone Co., Ltd.) and a solvent (ethyl acetate) for adjusting viscosity were added to the acrylic polymer solution so that a pressure-sensitive adhesive solution (11% in solids content) was prepared. The pressure-sensitive adhesive solution was applied to a release film (a polyethylene terephthalate substrate, DIAFOIL MRF38 manufactured by Mitsubishi Chemical Polyester Co., Ltd.) by a reverse roll coating method such that the coating would have a post-drying thickness of 25 µm, and then the coating was dried in a circulating hot air oven at 130° C. for 3 minutes to form a pressure-sensitive adhesive layer. The pressure-sensitive adhesive layer was bonded to the surface of the anchor layer so that a pressure-sensitive adhesive polarizing plate was prepared.

Example 2

Preparation of Water-dispersible Acrylic Pressure-Sensitive Adhesive

To a vessel were added 100 parts of butyl acrylate, 5 parts of acrylic acid, 2 parts of mono[poly(propylene oxide) methacrylate] phosphate (in which the average degree of polymerization of propylene oxide was 5.0), and 0.01 parts of 3-methacryloyloxypropyl-triethoxysilane (KBM-503) as raw materials, and mixed to prepare a monomer mixture. To 627 parts of the prepared monomer mixture were added 13 parts of a reactive emulsifier of AQUALON HS-20 (manufactured by Dai-ich Kogyo Seiyaku Co., Ltd.) and 360 parts of ion-exchanged water, and forced to be emulsified by stirring at 5000 rpm for 5 minutes with a homogenizer (manufactured by Tokushu Kika Kogyo Co., Ltd.) so that a monomer pre-emulsion was prepared.

Then, 200 parts of the prepared monomer pre-emulsion and 330 parts of ion-exchanged water were added to a reaction vessel equipped with a cooling tube, a nitrogen-introducing tube, a thermometer, a dropping funnel, and a stirring blade. The space of the reaction vessel was then replaced with nitrogen gas. Thereafter, 0.2 parts of 2,2'-azobis[N-(2-carboxyethyl)-2-methylpropionamidine]hydrate (VA-057, manufactured by Wako Pure Chemical Industries, Ltd.) was added to the reaction vessel, and polymerization was performed at 60° C. for 1 hour. Then, 800 parts of the remaining monomer pre-emulsion was added dropwise to the reaction vessel over 3 hours, and then polymerization was performed for 3 hours. Thereafter, polymerization was further performed at 60° C. for 3 hours, while nitrogen gas replacement was performed, so that an emulsion of a water-dispersible pressure-sensitive adhesive composition with a solids content of 48% was obtained.

The emulsion was then cooled to room temperature. Thereafter, 30 parts of aqueous ammonia at a concentration of 10% was added thereto, and 3.0 parts of an acrylic thickener (ARON B-500, manufactured by Toagosei Co., Ltd.) was further added thereto, so that a water-dispersible pressure-sensitive adhesive composition was prepared.

(Formation of Pressure-Sensitive Adhesive Layer)

The water-dispersible pressure-sensitive adhesive composition was applied to a release film (a polyethylene terephthalate substrate, DIAFOIL MRF38 manufactured by Mitsubishi Chemical Polyester Co., Ltd.) by a reverse roll coating method such that the coating would have a post-drying thickness of 25 μm, and then the coating was dried in a circulating hot air oven at 100° C. for 3 minutes to form a pressure-sensitive adhesive layer. The pressure-sensitive adhesive layer was bonded to the surface of the anchor layer formed on the polarizing plate obtained in example 1 so that a pressure-sensitive adhesive polarizing plate was prepared.

Example 3

A pressure-sensitive adhesive polarizing plate was prepared using the process of example 1, except that the temperature and time for the formation of the anchor layer was changed from 100° C. and 1 minute to 50° C. and 1 minute.

Example 4

Formation of Anchor Layer

An acrylate ester (POLYMENT NK380, manufactured by Nippon Shokubai Co., Ltd.) was diluted with toluene to a solid content of 2% so that a solvent-dispersible material (an anchor agent) was prepared. The anchor agent was applied to one side of the polarizing plate of example 1 with a wire bar such that the coating would have a post-drying thickness of 100 nm, and the coating was dried at 40° C. for 2 minutes to form an anchor layer.

(Formation of Pressure-Sensitive Adhesive Layer)

The water-dispersible pressure-sensitive adhesive composition prepared in example 2 was applied to a release film (a polyethylene terephthalate substrate, DIAFOIL MRF38 manufactured by Mitsubishi Chemical Polyester Co., Ltd.) by a reverse roll coating method such that the coating would have a post-drying thickness of 25 μm, and then the coating was dried in a circulating hot air oven at 130° C. for 3 minutes to form a pressure-sensitive adhesive layer. The pressure-sensitive adhesive layer was bonded to the surface of the resulting anchor layer formed on the polarizing plate so that a pressure-sensitive adhesive polarizing plate was prepared.

Comparative Example 1

A pressure-sensitive adhesive polarizing plate was prepared using the process of example 1, except that the weight ratio of solution A:aqueous ammonia was changed to 100: 0.01 when the water-dispersible material (anchor agent) was prepared.

Comparative Example 2

A pressure-sensitive adhesive polarizing plate was prepared using the process of example 1, except that the weight ratio of solution A:aqueous ammonia was changed to 100:1 when the water-dispersible material (anchor agent) was prepared and that the drying conditions was changed from 100° C. for 1 minute to 23° C. for 1 minute when the anchor layer was formed.

Comparative Example 3

A pressure-sensitive adhesive polarizing plate was prepared using the process of example 2, except that the anchor layer was formed according to example 4, the amount of the addition of aqueous ammonia at a concentration of 10% was changed from 30 parts to 3 parts when the water-dispersible pressure-sensitive adhesive composition was prepared, and the drying conditions was changed from 100° C. for 3 minutes to 150° C. for 3 minute when the pressure-sensitive adhesive layer was formed.

Comparative Example 4

A pressure-sensitive adhesive polarizing plate was prepared using the process of example 2, except that the anchor layer was formed according to example 4, the amount of the addition of aqueous ammonia at a concentration of 10% was changed from 30 parts to 50 parts when the water-dispersible pressure-sensitive adhesive composition was prepared.

The pressure-sensitive adhesive polarizing plate obtained in each of the examples and the comparative examples was evaluated as described below. The results are shown in Table 1.

(Quantitative Measurement of Ammonia)

The pressure-sensitive adhesive polarizing plate was cut into a 9 cm×9 cm piece. The cut piece was subjected to boiling and extraction in pure water at 120° C. for 1 hour. Ammonium ions in the extract were quantitatively determined by ion chromatography (DX-500, manufactured by Dionex Corporation). Five samples were measured, and the average was obtained from the measurements. The average was converted into a value per 1 $cm^2$ which was defined as ammonia content.

(Appearance)

The prepared pressure-sensitive adhesive polarizing plate was visually evaluated according to the following criteria:

o: There is no defect.

x: There are some defects (stripes or uneven portions).

(Polarization Properties)

The pressure-sensitive adhesive polarizing plate was cut into a 15 inch-size sample. The sample was bonded to a glass plate, and the degree of polarization of the laminate was measured. The degree of polarization at this time was defined as the initial degree of polarization (A). The sample was then allowed to stand in an environment at 90° C. for 1,000 hours and in an environment at 60° C. and 95% RH for 1,000 hours, respectively. Thereafter, the degree of polarization was measured in the same manner, and the degree of polarization at this time was defined as the post-treatment degree of polarization (B). The degree of polarization was measured with a spectrophotometer (DOT-3C, manufactured by Murakami Color Research Laboratory). The amount of change in the degree of polarization (A-B) was calculated from the initial degree of polarization (A) and the post-treatment degree of polarization (B).

TABLE 1

| | Anchor Layer | | Pressure-Sensitive Adhesive Layer | Pressure-Sensitive Adhesive Optical Film | | Amount of Change in Polarization Degree | |
|---|---|---|---|---|---|---|---|
| | Type of Forming Agent | Ammonia Content (ng/cm$^2$) | Type of Forming Agent | Ammonia Content (ng/cm$^2$) | Appearance | 90° C. × 1,000 hours | 60° C./95% RH × 1,000 hours |
| Example 1 | Water-dispersible | 14 | Solvent-dispersible | 14 | ○ | 0.4 | 0.3 |
| Example 2 | Water-dispersible | 14 | Water-dispersible | 1850 | ○ | 0.5 | 0.5 |
| Example 3 | Water-dispersible | 25 | Solvent-dispersible | 25 | ○ | 0.4 | 0.4 |
| Example 4 | Solvent-dispersible | — | Water-dispersible | 1400 | ○ | 0.4 | 0.5 |
| Comparative Example 1 | Water-dispersible | 2.5 | Solvent-dispersible | 2.5 | x | 0.3 | 0.4 |
| Comparative Example 2 | Water-dispersible | 2200 | Solvent-dispersible | 2200 | ○ | 2.0 | 5.6 |
| Comparative Example 3 | Solvent-dispersible | — | Water-dispersible | 7 | x | 0.5 | 0.5 |
| Comparative Example 4 | Solvent-dispersible | — | Water-dispersible | 2800 | ○ | 2.5 | 12.2 |

The invention claimed is:

1. A pressure-sensitive adhesive optical film, comprising:
an optical film; and
an acrylic pressure-sensitive adhesive layer laminated on at least one side of the optical film with an anchor layer interposed therebetween, wherein
the anchor layer has a thickness of 5 to 300 nm,
the acrylic pressure-sensitive adhesive layer has a thickness of 5 to 50 μm,
at least one of the anchor layer and the acrylic pressure-sensitive adhesive layer is made from a ammonia-containing water-dispersible material,
the layer made from the ammonia-containing water-dispersible material contains ammonia in an amount of 10 ng or more per 1 cm$^2$ of the pressure-sensitive adhesive optical film, wherein the amount is a measurement derived from the layer, and
the pressure-sensitive adhesive optical film contains ammonia in a total amount of 2000 ng or less per 1 cm$^2$ of the pressure-sensitive adhesive optical film.

2. The pressure-sensitive adhesive optical film according to claim 1, wherein the acrylic pressure-sensitive adhesive layer is made from an ammonia-containing water-dispersible acrylic pressure-sensitive adhesive.

3. The pressure-sensitive adhesive optical film according to claim 1, wherein the anchor layer is made from an anchor agent containing ammonia and a water-dispersible polymer.

4. The pressure-sensitive adhesive optical film according to claim 3, wherein the anchor agent further contains an antistatic agent.

5. An image display, comprising at least one piece of the pressure-sensitive adhesive optical film according to claim 1.

* * * * *